US011152963B2

(12) United States Patent
Coffey et al.

(10) Patent No.: US 11,152,963 B2
(45) Date of Patent: Oct. 19, 2021

(54) CLEAR CHANNEL ASSESSMENT POLICY DETERMINATION METHOD AND COMMUNICATION SYSTEM THEREOF

(71) Applicant: Realtek Semiconductor Corp., HsinChu (TW)

(72) Inventors: John Timothy Coffey, San Francisco, CA (US); Der-Zheng Liu, Hsinchu County (TW); Hsuan-Yen Chung, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/867,523

(22) Filed: May 5, 2020

(65) Prior Publication Data

US 2020/0404705 A1 Dec. 24, 2020

Related U.S. Application Data

(60) Provisional application No. 62/863,276, filed on Jun. 19, 2019.

(51) Int. Cl.
*H04B 1/04* (2006.01)
*H04L 27/26* (2006.01)
*H04W 74/08* (2009.01)

(52) U.S. Cl.
CPC ........... *H04B 1/04* (2013.01); *H04L 27/2628* (2013.01); *H04W 74/0808* (2013.01)

(58) Field of Classification Search
CPC .. H04B 1/04; H04L 27/2628; H04W 74/0808; H04W 8/245; H04M 1/72519
USPC ............. 370/329, 310.2; 455/418, 450.1
See application file for complete search history.

(56) References Cited

U.S. PATENT DOCUMENTS

| 5,844,922 | A | 12/1998 | Wolf | |
| 10,104,692 | B2* | 10/2018 | Khawer | H04B 17/318 |
| 10,172,137 | B1* | 1/2019 | Hedayat | H04W 72/0473 |
| 2007/0270102 | A1 | 11/2007 | Zhu | |
| 2011/0122846 | A1 | 5/2011 | Yu | |
| 2014/0254709 | A1 | 9/2014 | Flowers | |
| 2016/0050684 | A1* | 2/2016 | Ni | H04W 72/1205 |
| | | | | 370/329 |

(Continued)

*Primary Examiner* — Danh C Le (74) *Attorney, Agent, or Firm* — Winston Hsu (57) ABSTRACT

A method of determining CCA (clear channel assessment) policy, applied in a communication system including multiple devices, is provided. The method includes the following steps: the devices broadcasting multiple policy indications, in which the devices include a coordinating device, multiple neighboring devices and multiple local client devices, the local client devices associate with the coordinating device to form a network, and the neighboring devices operate within at least one neighboring network; the coordinating device obtaining multiple neighboring policy indications from multiple neighboring frames transmitted by the neighboring devices; and the coordinating device determining whether to change a coordinating policy indication corresponding to the coordinating device according to the neighboring policy indications. A policy indication of a device indicates a policy among multiple CCA policies. The CCA policies include a first policy and a second policy, and the first policy is less sensitive to a sensed signal than the second policy.

20 Claims, 3 Drawing Sheets

(56) References Cited

U.S. PATENT DOCUMENTS

| | | | |
|---|---|---|---|
| 2016/0381565 A1* | 12/2016 | Oteri | H04W 28/18 |
| | | | 370/328 |
| 2017/0041798 A1* | 2/2017 | Li | H04W 74/0816 |
| 2017/0134975 A1* | 5/2017 | Huang | H04L 43/16 |
| 2017/0367118 A1 | 12/2017 | Choi | |
| 2018/0014327 A1* | 1/2018 | Park | H04L 69/323 |
| 2018/0317233 A1* | 11/2018 | Tsodik | H04W 76/10 |
| 2018/0324604 A1 | 11/2018 | Yang | |
| 2018/0338233 A1* | 11/2018 | Cariou | H04W 4/80 |
| 2019/0090256 A1* | 3/2019 | Liu | H04L 5/0094 |
| 2019/0124695 A1* | 4/2019 | Seok | H04W 72/0473 |
| 2019/0342796 A1 | 11/2019 | Lepp | |
| 2019/0373635 A1* | 12/2019 | Yang | H04B 7/0408 |
| 2021/0153248 A1* | 5/2021 | Jang | H04L 5/00 |

* cited by examiner

CLEAR CHANNEL ASSESSMENT POLICY DETERMINATION METHOD AND COMMUNICATION SYSTEM THEREOF

CROSS REFERENCE TO RELATED APPLICATIONS

This application claims the benefit of U.S. provisional application No. 62/863,276, filed on Jun. 19, 2019, which is incorporated herein by reference.

BACKGROUND OF THE INVENTION

1. Field of the Invention

The present application relates to a CCA (clear channel assessment) policy determination method and a communication system, and more particularly, to a CCA policy determination method and a communication system capable of utilizing spatial reuse to enhance system throughput.

2. Description of the Prior Art

CSMA (Carrier Sense Multiple Access) mechanism is widely used in a distributed-control network or WLAN (Wireless Local Area Network) complying with IEEE 802.11 protocol. Within the CSMA mechanism, CCA (Clear Channel Assessment) is performed to sense whether the channel/medium is busy or clear.

According to IEEE 802.11 protocol, the CCA operation includes two portions: energy detection and carrier sensing. The carrier sensing is to detect whether a Wi-Fi preamble is transmitted over the channel and to decode the possible Wi-Fi preamble, when the in-band signal energy is above a CS threshold. The CCA flag would be held busy until the end of data transmission. On the other hand, the energy detection is to detect Wi-Fi or non-Wi-Fi energy (e.g., Bluetooth energy) in the operating channel. If the in-band signal energy is higher than the ED threshold, the CCA flag is held busy until the energy is below the ED threshold. The ED threshold is 20 dB above the CS threshold. For example, as specified in IEEE 802.11, the CS threshold may be −82 dBm, which is the minimum modulation and coding rate sensitivity for 20 MHz channel spacing, and the ED threshold may be −62 dBm.

In system throughput perspective, the low CS threshold/sensitivity enlarges a spatial region in which two stations cannot share the same channel/medium simultaneously, such that a system throughput over a physical region/area of the WLAN is limited. Therefore, it is necessary to improve the prior art.

SUMMARY OF THE INVENTION

It is therefore a primary objective of the present application to provide a CCA policy determination method and a communication system capable of enhancing spatial reuse, to improve over disadvantages of the prior art.

An embodiment of the present application provides a method of determining CCA (clear channel assessment) policy, applied in a communication system including a plurality of devices. The method includes the following steps: the devices broadcasting multiple policy indications, in which the devices include a coordinating device, multiple neighboring devices and multiple local client devices, the local client devices associate with the coordinating device to form a network, and the neighboring devices operate within at least one neighboring network; the coordinating device obtaining multiple neighboring policy indications from multiple neighboring frames transmitted by the neighboring devices; and the coordinating device determining whether to change a coordinating policy indication corresponding to the coordinating device according to the neighboring policy indications. A policy indication of a device indicates a policy among multiple CCA policies. The CCA policies include a first policy and a second policy, and the first policy is less sensitive to a sensed signal than the second policy.

An embodiment of the present application further provides a communication system. The communication system includes multiple devices, in which the devices comprise a coordinating device, multiple neighboring devices and multiple local client devices, the local client devices associate with the coordinating device to form a network, and the neighboring devices operates within at least one neighboring network. The devices are configured to broadcast multiple policy indications. The coordinating device is configured to perform the following steps: obtaining multiple neighboring policy indications from multiple neighboring frames transmitted by the neighboring devices; and determining whether to change a coordinating policy indication corresponding to the coordinating device according to the neighboring policy indications. A policy indication of a device indicates a policy among multiple CCA policies, the CCA policies comprise a first policy and a second policy, and the first policy is less sensitive to a sensed signal than the second policy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
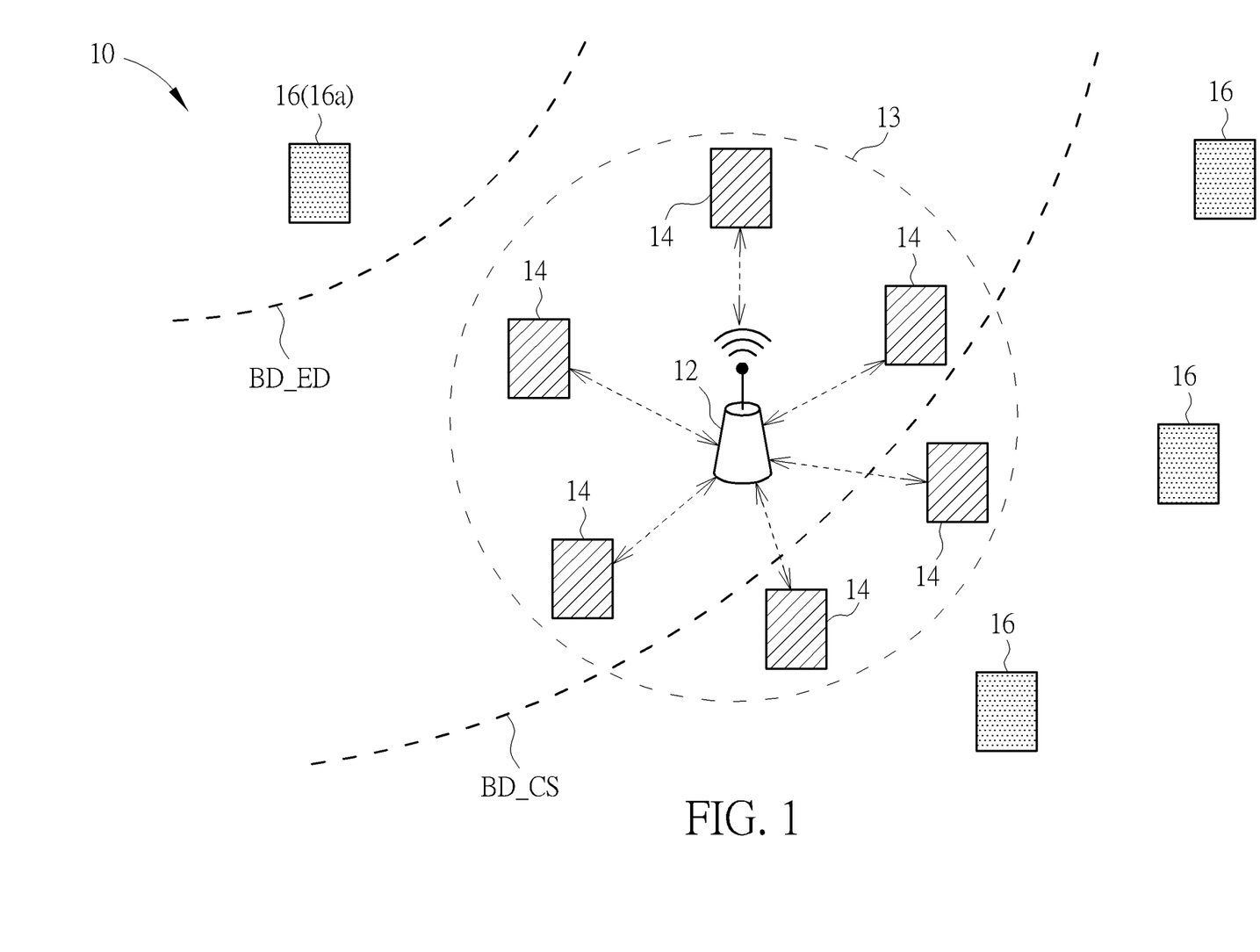
FIG. 1 is a schematic diagram of a communication system according to an embodiment of the present application.

FIG. 1 is a schematic diagram of a communication system 10 according to an embodiment of the present application. The communication system 10 may operate as a wireless local area network (WLAN) complying with IEEE 802.11 protocol. The communication system 10 comprises a coordinating device 12, a plurality of local client devices 14 and a plurality of neighboring devices 16. The coordinating device 12 is referred to an access point (AP), and the local client devices 14 are referred to non-AP devices. The local client devices 14 may connect to and associate with the coordinating device 12, such that the coordinating device 12 and the local client devices 14 form a network 13. The neighboring devices 16, each of which may be an AP device or a non-AP device, are devices out of the network 13, and operate within one or more neighboring network(s) (not illustrated in FIG. 1) beside the network 13. In terminology of IEEE 802.11, the network 13 is referred to a BSS (Basic Service Set), and the neighboring network is referred to an OBSS (Overlapping Basic Service Set).

As known in the art, the CCA (Clear Channel Assessment) operation includes two portions: energy detection (ED) and carrier sensing (CS). For the ED operation, the CCA flag is held busy when a sensed signal power is above an ED power threshold. For the CS operation, the CCA flag is held busy for a duration indicated by the Wi-Fi preamble when the sensed signal power is above a CS power threshold, and when the sensed signal commences with a Wi-Fi preamble. The CS power threshold is often 20 dB lower than the ED power threshold, i.e., the CS operation is more sensitive to/on sensed signal power than the ED operation.

For all the devices performing the CS operation, a spatial region/area in which two stations cannot share the same channel/medium simultaneously would be large, which may lower the system throughput. Illustratively, in FIG. 1, a boundary BD_ED corresponding to the ED power threshold and a boundary BD_CS corresponding to the CS power threshold, with respect to a neighboring device 16a (at the top-left corner of FIG. 1), are illustrated. In one embodiment, it is assumed that the neighboring device 16a is a Wi-Fi device, and the neighboring device 16a is performing its transmission. If the CS operation is performed by all the devices in FIG. 1, CCA flags of the coordinating device 12 and the client devices 14 between the boundary BD_ED and the boundary BD_CS may be held busy, and these devices (the ones between BD_ED and BD_CS) may have no chance to obtain transmission opportunity. Although the CS operation would provide good protection of transmission of the device 16a, it may be too conservative in the perspective of the system throughput, and the system throughput would be limited by the too conservative strategy.

In another perspective, if the devices between BD_ED and BD_CS (including the device 12 and some of the devices 14 between BD_ED and BD_CS) perform only the ED operation but not the CS operation, these devices may have chances to gain transmission opportunity. It is because that these devices are beyond the boundary BD_ED of the device 16a. In this regard, the system throughput can be further enhanced by selecting CCA policies, due to the fact that the devices within the spatial region between BD_ED and BD_CS may obtain transmission opportunity and share the same channel/medium simultaneously, which can be regarded as a kind of spatial reuse.

In view of the above statement, the devices within the communication system 10 may determine which CCA policy they would like to adopt. In an embodiment, the device in the system 10 may choose to adopt a first policy or a second policy.

When the device chooses to adopt the first policy, the device performs a first energy detection on the sensed signal power, and holds the CCA flag only when the sensed signal power perceived by the device is above the first power threshold (e.g., the ED power threshold or −62 dBm). In other words, the first policy may represent that the device performs only the ED operation but not the CS operation.

When the device chooses to adopt the second policy, the device performs a second energy detection on the sensed signal power and a preamble detection on the sensed signal when the sensed signal power is above the second power threshold (e.g., the CS power threshold or −82 dBm), and the device also performs the first energy detection on the sensed signal power. For case of the second policy, the device holds the CCA flag, when "the sensed signal power is above the second power threshold and a Wi-Fi preamble is detected" in the duration signaled by the Wi-Fi preamble, or when "the sensed signal power is above the first power threshold." In other words, the second policy may represent that the device performs both the ED operation and the CS operation.

It should be noted that the second policy may be regarded as a legacy CCA policy which has been defined in the IEEE 802.11 protocol. Compared to the second policy, the first policy is relatively aggressive.

Figure 2:
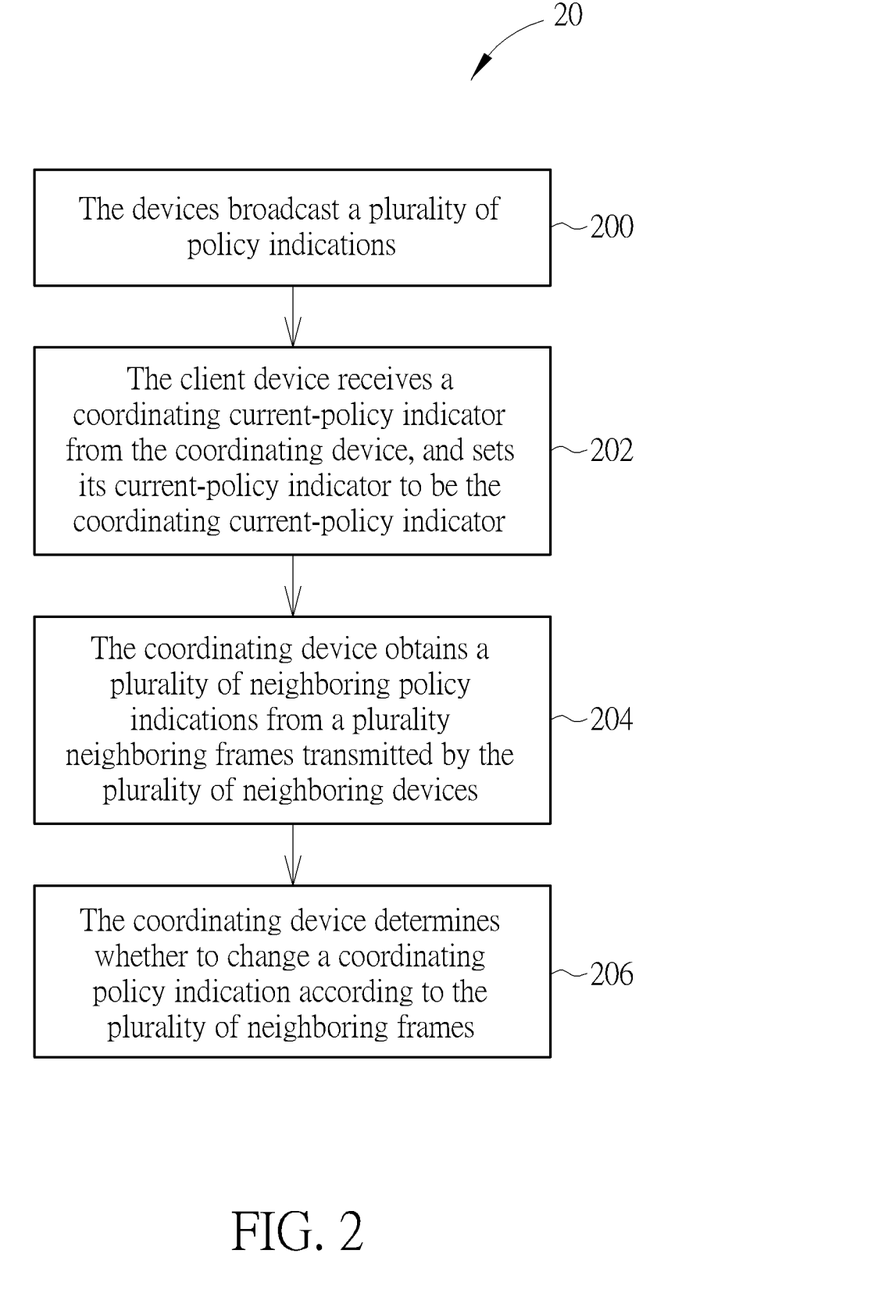
FIG. 2 is a schematic diagram of a method according to an embodiment of the present application.

FIG. 2 is a schematic diagram of a method 20 according to an embodiment of the present application. The communication system 10 is configured to execute the method 20 to determine a CCA policy, to enhance a system throughput.

In Step 200, all the devices within the system 10, including the coordinating device 12, the local client devices 14 and the neighboring devices 16, broadcast their corresponding policy indications. In an embodiment, a policy indication of the device may comprise a current-policy indicator $b_0$ and a preference-policy indicator $b_1$. The current-policy indicator $b_0$ indicates which policy the device currently adopts; the preference-policy indicator $b_1$ indicates which policy the device prefers to adopt.

In an embodiment, the policy indicated by the policy indication/indicator may refer to either the first policy or the second policy stated above. In an embodiment, the policy indicated by the current-policy indicator $b_0$ or the preference-policy indicator $b_1$ may refer to either the first policy or the second policy stated above.

In an embodiment, the policy indications (e.g., $b_0$ and $b_1$) may be transmitted within a field of L-SIG, HT-SIG, VHT-SIG or EHT-SIG within a preamble of a Wi-Fi frame. Moreover, a coordinating current-policy indicator $b_{0,AP}$ is referred to the current-policy indicator $b_0$ of the coordinating device 12.

In Step 202, each of the client devices 14 receives the coordinating current-policy indicator $b_{0,AP}$ from the coordinating device 12, and sets its current-policy indicator $b_0$ to be the coordinating current-policy indicator $b_{0,AP}$, i.e., $b_0=b_{0,AP}$. According to Step 202, the current-policy indicator $b_0$ of all client devices 14 within the network/BSS 13 would be consistent with the one of the coordinating device 12, i.e., the coordinating current-policy indicator $b_{0,AP}$.

In an embodiment, for the preference-policy indicator $b_1$, there is no restriction on the device setting the preference-policy indicator $b_1$, the device can set whatever they like on $b_1$.

In Step 204, the coordinating device 12 obtains a plurality of neighboring policy indications from a plurality neighboring frames (i.e., OBSS frames) transmitted by the plurality of neighboring devices (i.e., devices with OBSSs). Specifically, the coordinating device 12 may receive a plurality of frames (including the neighboring frames) from the devices within the system 10. The frames may be, for example, control frames, data frames or management frames. The coordinating device 12 may monitor/determine whether power levels of the received frames are higher than a minimum decodable power threshold. For the frames with the power level higher than the minimum decodable power threshold, the coordinating device 12 performs a decoding operation on the received frames, in order to distinguish whether the frame is transmitted by/from any of the neighboring devices 16, and further to obtain the policy indication (e.g., $b_0$ and $b_1$) transmitted in the frames. The frames and the policy indications transmitted by the neighboring devices 16 are named as the neighboring frames and the neighboring policy indications.

In an embodiment, the coordinating device 12 may distinguish whether the frame is transmitted by/from the neighboring devices 16 according to a BSS color code within the frame, which is known and not narrated for brevity. In an embodiment, the coordinating device 12 may distinguish whether the frame is transmitted by/from the neighboring devices 16 according to the power level of the frame. If the power level of the frame is lower than a certain threshold, the frame may be regarded/determined by the coordinating device 12 as a frame for a neighboring BSS, i.e., the neighboring frame.

In an embodiment, all of the devices within the system 10 may obtain the neighboring policy indications transmitted by the neighboring devices, following similar details stated above.

In Step 206, the coordinating device 12 determines whether to change the coordinating policy indication according to the plurality of neighboring frames (e.g., OBSS frames). Specifically, the coordinating device 12 determines whether to change the coordinating current-policy indicator $b_{0,AP}$ according to the plurality of neighboring frames. Determining $b_{0,AP}$ is crucial because all the local client devices 14 within network 13 would follow the policy indicated by the coordinating current-policy indicator $b_{0,AP}$, due to Step 202 being executed.

In some embodiments, the coordinating device 12 determines whether to change the coordinating current-policy indicator $b_{0,AP}$ according to the plurality of neighboring frames, within the constraints described in rules described below.

In general, the coordinating device 12 may make decision among a plurality of CCA policies. For example, the CCA policies may be related to a plurality of ED operation corresponding to a plurality of power thresholds, or be related to a plurality of signal-format detections, in which the preamble detection is one kind of the signal-format detections.

In an embodiment, the coordinating device 12 may make a choice between the first policy and the second policy. In this case, the current-policy indicator $b_0$ (including $b_{0,AP}$) would be binary. In an embodiment, $b_{0,AP}=1$ refers to the first policy being adopted, and $b_{0,AP}=0$ refers to the second policy being adopted, by the coordinating device 12. The behavior of the coordinating device 12 may be illustrated as a state transition diagram shown in FIG. 3.

Figure 3:
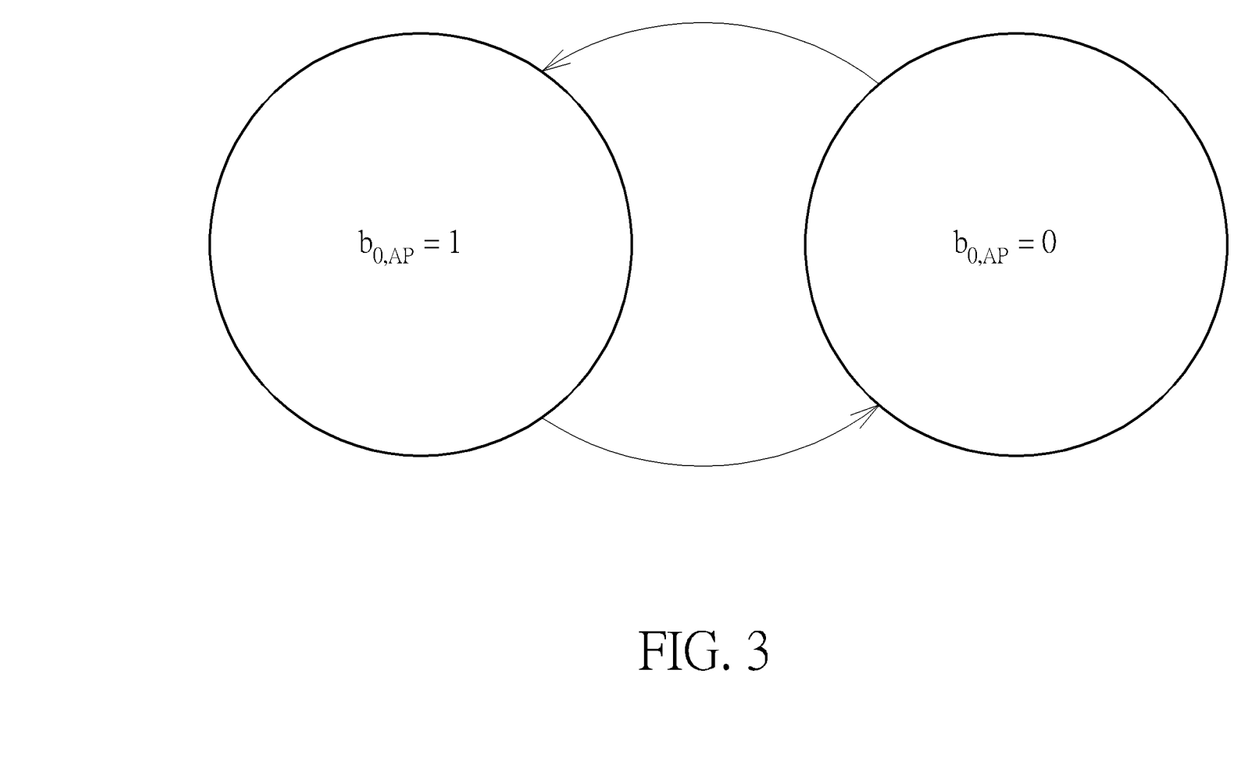
FIG. 3 is a schematic diagram of a state diagram according to an embodiment of the present application.

Suppose that the coordinating device 12 stays in a state of $b_{0,AP}=0$, the coordinating device 12 may decide to switch to a state of $b_{0,AP}=1$ under several conditions, wherein the several conditions depend on the plurality of neighboring frames.

In an embodiment, from a plurality of N_f neighboring frames (which may be the latest fixed number of neighboring frames received by the coordinating device 12), the coordinating device 12 may focus on a plurality of first neighboring frames, wherein the first neighboring frames are neighboring frames (transmitted by first neighboring devices) which comprise first neighboring policy indications indicating that the first policy is adopted and/or that the first policy is preferred ("$b_0=1$", "$b_1=1$", or "$b_0=1$ and $b_1=1$"). The coordinating device 12 may obtain a first-neighboring-frame number, generally denoted as $N_{OBSS,b0/b1=1}$, of the plurality of first neighboring frames, and determine whether the first-neighboring-frame number $N_{OBSS,b0/b1=1}$ is greater than a number threshold N_th. When the first-neighboring-frame number $N_{OBSS,b0/b1=1}$ is greater than N_th, the coordinating device 12 may decide to switch from the state of $b_{0,AP}=0$ to the state of $b_{0,AP}=1$. That is, given a sufficient consensus among the frames transmitted by neighboring devices, the coordinating device 12 may switch its adopted policy to the first policy. The number threshold N_th may be predetermined or adapted dynamically.

In an embodiment, the first neighboring frames may be neighboring frames with $b_0=1$. The coordinating device 12 may obtain a first-neighboring-frame number, specifically denoted as $N_{OBSS,b0=1}$, of the first neighboring frames with $b_0=1$, determine whether $N_{OBSS,b0=1}>$N_th, and determine to switch from the state of $b_{0,AP}=0$ to the state of $b_{0,AP}=1$ when $N_{OBSS,b0=1}>$N_th. That is, given a sufficient proportion of the neighboring frames signaling that the first policy is adopted, the coordinating device 12 may switch its adopted policy to the first policy.

Similarly, the first neighboring frames may be neighboring frames with $b_1=1$. The coordinating device 12 may obtain a first-neighboring-frame number, specifically denoted as $N_{OBSS,b1=1}$, of the plurality of first neighboring frames with $b_1=1$, determine whether $N_{OBSS,b1=1}>$N_th, and determine to switch from the state of $b_{0,AP}=0$ to the state of $b_{0,AP}=1$ when $N_{OBSS,b1=1}>$N_th. That is, given a sufficient proportion of the neighboring frames signaling that the first policy is preferred, the coordinating device 12 may switch its adopted policy to the first policy.

In an embodiment, the coordinating device 12 may further obtain a neighboring-frame number $N_{OBSS}$ of the plurality of neighboring frames, and obtain a ratio R2, where the ratio R2 may be one of ($N_{OBSS,b0/b1=1}/N_{OBSS}$), ($N_{OBSS,b0=1}/N_{OBSS}$) or ($N_{OBSS,b1=1}/N_{OBSS}$). The coordinating device 12 may determine whether the ratio R2 is greater than a ratio threshold R_th_2, and determine to switch from the state of $b_{0,AP}=0$ to the state of $b_{0,AP}=1$ when R2>R_th_2. That is, given a sufficient proportion of the neighboring frames signaling that the first policy is adopted and/or preferred, the coordinating device 12 may switch its adopted policy to the first policy.

In an embodiment, the coordinating device 12 may obtain a frame number $N_F$ of a plurality of frames which is latest received by the coordinating device 12. Suppose that the latest received $N_F$ frames comprise the neighboring frames, the coordinating device 12 may obtain the neighboring-frame number $N_{OBSS}$ of the neighboring frames among the latest received $N_F$ frames, and obtain a ratio R1 as ($N_{OBSS}/N_F$). The coordinating device 12 may determine whether the ratio R1 is less than a ratio threshold R_th_1, and determine to switch from the state of $b_{0,AP}=0$ to the state of $b_{0,AP}=1$ when R1<R_th_1. That is, given that the proportion of neighboring frames out of all latest received frames is sufficiently low, the coordinating device 12 may switch its adopted policy to the first policy.

Suppose that the coordinating device 12 stays in a state of $b_{0,AP}=1$, the coordinating device 12 may be required to switch to a state of $b_{0,AP}=0$ under several conditions, wherein the several conditions depend on the plurality of neighboring frames.

In an embodiment, the coordinating device 12 may obtain a frame number $N_F'$ of a plurality of frames which is latest received by the coordinating device 12. Suppose that the latest received $N_F'$ frames comprise the plurality of neighboring frames, the coordinating device 12 may focus on a set of second neighboring frames among the latest received $N_F'$ frames. The second neighboring frames are neighboring frames, each of which comprises second neighboring policy indications indicating that the second policy is adopted and/or preferred ("$b_0=0$", "$b_1=0$", or "$b_0=0$ and $b_1=0$"), or comprises no policy. Accordingly, the coordinating device 12 may obtain a second-neighboring frame number, generally denoted as $N_{OBSS'b0/b1\neq1}$, of the second neighboring frames, and determine a ratio R1' as ($N_{OBSS'b0/b1\neq1}/N_F'$). The coordinating device 12 may determine whether the ratio R1' is greater than a ratio threshold R_th_1', and determine to switch from the state of $b_{0,AP}=1$ to the state of $b_{0,AP}=0$ when R1'>R_th_1'. That is, given that the proportion of neighboring frames out of all latest received frames that signal adoption or preference for the second policy, or that do not indicate a preference, is sufficiently high, the coordinating device 12 may switch its adopted policy to the second policy. In an embodiment, the coordinating device 12 switching from the state of $b_{0,AP}=1$ to the state of $b_{0,AP}=0$ when R1'>R_th_1' is mandatory for the coordinating device 12 under these conditions. That is, given a sufficient proportion of the neighboring frames signaling that the second policy is adopted or preferred or both, the coordinating device 12 may be required to switch its adopted policy to the second policy.

In an embodiment, the conditions under which the coordinating device 12 may be required to switch from the first policy to the second policy may include different thresholds and different pluralities of received frames for $b_0=0$, for $b_1=0$, and for frames not indicating policies, in ways that will be clear to those skilled in the art. In some embodiments, when the coordination device 12 adopts the first policy, the coordination device 12 further determines whether the ratio R2 is greater than the ratio threshold R_th_3. When the coordination device 12 determines that the ratio R2 is greater than the ratio threshold R_th_3, the coordination device 12 changes the policy adopted by the coordinating device 12 from the first policy to the second policy.

Referring back to FIG. 1, after performing the method 20, the coordinating device 12 may have chances to choose the aggressive first policy, and thus the local client devices 14 between BD_ED and BD_CS may have (more) chances to obtain transmission opportunities when the neighboring device 16a performs its transmission. An overall system throughput of the system 10 would be enhanced.

The method 20 provides the embodiment of the coordinating policy indication being determined (by the coordinating device 12) according to the neighboring frames, which is not limited thereto. The coordinating device 12 may periodically or aperiodically determine to switch from the state of $b_{0,AP}=0$ to the state of $b_{0,AP}=1$, which is also within the scope of the present application.

In Step 206, the coordinating device 12 does not specifically differentiate one neighboring network from another, which is not limited thereto. The neighboring devices 16 may belong to different neighboring networks (or OBSSs, e.g., by BSS color code), and the thresholds in Step 206 (e.g., N_th, R_th_1, R_th_2) may be adjusted to be different corresponding to the neighboring networks. In other words, the coordinating device 12 may value/weight devices within different neighboring networks in a different manner.

In summary, the present application allows the devices to adopt aggressive CCA policy, to alleviate the conservative/legacy CCA policy. Hence, the system throughput is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining clear channel assessment (CCA) policy, applied in a communication system comprising a plurality of devices, the method comprising:
the plurality of devices broadcasting a plurality of policy indications, wherein the plurality of devices comprise a coordinating device, a plurality of neighboring devices and a plurality of local client devices, the plurality of local client devices associate with the coordinating device to form a network, and the plurality of neighboring devices operate within at least one neighboring network;
the coordinating device obtaining a plurality of neighboring policy indications from a plurality neighboring frames transmitted by the plurality of neighboring devices; and
the coordinating device determining whether to change a coordinating policy indication corresponding to the coordinating device according to the neighboring policy indications;
wherein a policy indication of a device indicates a policy among a plurality of CCA policies;
wherein the plurality of CCA policies comprises a first policy and a second policy, and the first policy is less sensitive to a sensed signal than the second policy.

2. The method of claim 1, wherein the step of the coordinating device obtaining the plurality of neighboring policy indications from the plurality of neighboring frames transmitted by the plurality of neighboring devices comprises:
the coordinating device determining whether a power level of a neighboring frame transmitted by a neighboring device is greater than a threshold; and
the coordinating device performing a decoding operation on the neighboring frame when the power level is greater than the threshold, to obtain a neighboring policy indication within the neighboring frame.

3. The method of claim 2, wherein the step of the coordinating device determining whether to change the coordinating policy indication comprises:
the coordinating device obtaining a plurality of first neighboring frames from a plurality of first neighboring devices, wherein the plurality of first neighboring frames comprises a plurality of first neighboring policy indications indicating that the first policy is adopted by the plurality of first neighboring devices;
the coordinating device determining whether a first-neighboring-frame number of the plurality of first neighboring frames is greater than a number threshold; and
when the first-neighboring-frame number is greater than the number threshold, the coordinating device changing the coordinating policy indication, so as to indicate that a policy adopted by the coordinating device is changed from the second policy to the first policy.

4. The method of claim 3, wherein the plurality of neighboring policy indications comprises a plurality of neighboring current-policy indicators, and the plurality of first neighboring frames comprises a plurality of first neighboring current-policy indicators indicating that the first policy is currently adopted by the plurality of first neighboring devices.

5. The method of claim 3, wherein the plurality of neighboring policy indications comprises a plurality of neighboring preference-policy indicators, and the plurality of first neighboring frames comprises a plurality of first neighboring preference-policy indicators indicating that the first policy is preferred to be adopted by the plurality of first neighboring devices.

6. The method of claim 3, wherein the step of the coordinating device determining whether to change the coordinating policy indication comprises:
the coordinating device obtaining a ratio of the first-neighboring-frame number to a neighboring-frame number of the plurality of neighboring frames, wherein the plurality of neighboring frames represents neighboring frames which are latest received by the coordinating device;
determining whether the ratio is greater than a first ratio threshold; and
when the ratio is greater than the first ratio threshold, the coordinating device changing the coordinating policy indication, so as to indicate that the policy adopted by the coordinating device is changed from the second policy to the first policy.

7. The method of claim 6, wherein the step of the coordinating device determining whether to change the coordinating policy indication comprises:
the coordinating device determining whether the ratio is greater than a second ratio threshold; and
when the coordinating device currently adopts the first policy and the ratio is greater than the second ratio threshold, the coordinating device changing the coordinating policy indication, so as to indicate that the policy adopted by the coordinating device is changed from the first policy to the second policy.

8. The method of claim 1, wherein the step of the step of the coordinating device determining whether to change the coordinating policy indication comprises:
the coordinating device obtaining a ratio of a neighboring-frame number of the plurality of neighboring frames to a frame number of a plurality of frames latest received by the coordinating device, wherein the plurality of frames comprises the plurality of neighboring frames;
determining whether the ratio is less than a second ratio threshold; and
when the ratio is less than the second ratio threshold, the coordinating device changing the coordinating policy indication, so as to indicate that the policy adopted by the coordinating device is changed from the second policy to the first policy.

9. The method of claim 1, further comprising:
a local client device, among the plurality of local client devices, receiving a coordinating current-policy indicator from the coordinating device; and
the local client device setting a current-policy indicator within a policy indication of the local client device to be the coordinating current-policy indicator.

10. The method of claim 1, wherein the communication system complies with IEEE 802.11 protocol, the at least one neighboring network is at least one OBSS (overlapping basic service set), the network is a BSS (basic service set), and the coordinating device is an AP (access-point).

11. The method of claim 1, wherein when the device adopts the first policy, the device purely performs a first energy detection at a first power threshold on the sensed signal power.

12. The method of claim 11, wherein when the device adopts the second policy, the device performs a second energy detection at a second power threshold and a preamble detection on the sensed signal power, and the second power threshold is less than the first power threshold.

13. A communication system, comprising:
a plurality of devices, wherein the plurality of devices comprises a coordinating device, a plurality of neighboring devices and a plurality of local client devices, the plurality of local client devices associates with the coordinating device to form a network, and the plurality of neighboring devices operates within at least one neighboring network;
wherein the plurality of devices is configured to broadcast a plurality of policy indications;
wherein the coordinating device is configured to perform the following steps:
obtaining a plurality of neighboring policy indications from a plurality neighboring frames transmitted by the plurality of neighboring devices; and
determining whether to change a coordinating policy indication corresponding to the coordinating device according to the neighboring policy indications;
wherein a policy indication of a device indicates a policy among a plurality of clear channel assessment (CCA) policies;
wherein the plurality of CCA policies comprises a first policy and a second policy, and the first policy is less sensitive to a sensed signal than the second policy.

14. The communication system of claim 13, wherein the coordinating device is further configured to perform the following steps, to obtain the plurality of neighboring policy indications from the plurality of neighboring frames transmitted by the plurality of neighboring devices comprises:
determining whether a power level of a neighboring frame transmitted by a neighboring device is greater than a threshold; and
performing a decoding operation on the neighboring frame when the power level is greater than the threshold, to obtain a neighboring policy indication within the neighboring frame.

15. The communication system of claim 14, wherein the coordinating device is further configured to perform the following steps, to determine whether to change the coordinating policy indication:
obtaining a plurality of first neighboring frames from a plurality of first neighboring devices, wherein the plurality of first neighboring frames comprises a plurality of first neighboring policy indications indicating that the first policy is adopted by the plurality of first neighboring devices;
determining whether a first-neighboring-frame number of the plurality of first neighboring frames is greater than a number threshold; and
when the first-neighboring-frame number is greater than the number threshold, the coordinating device changing the coordinating policy indication, so as to indicate that a policy adopted by the coordinating device is changed from the second policy to the first policy.

16. The communication system of claim 15, wherein the plurality of neighboring policy indications comprises a plurality of neighboring current-policy indicators, and the plurality of first neighboring frames comprises a plurality of first neighboring current-policy indicators indicating that the first policy is currently adopted by the plurality of first neighboring devices.

17. The communication system of claim 15, wherein the plurality of neighboring policy indications comprises a plurality of neighboring preference-policy indicators, and the plurality of first neighboring frames comprises a plurality of first neighboring preference-policy indicators indicating that the first policy is preferred to be adopted by the plurality of first neighboring devices.

18. The communication system of claim 15, wherein the coordinating device is further configured to perform the following steps, to determine whether to change the coordinating policy indication:
obtaining a ratio of the first-neighboring-frame number to a neighboring-frame number of the plurality of neighboring frames, wherein the plurality of neighboring frames represents neighboring frames which are latest received by the coordinating device;

determining whether the ratio is greater than a first ratio threshold; and when the ratio is greater than the first ratio threshold, changing the coordinating policy indication, so as to indicate that the policy adopted by the coordinating device is changed from the second policy to the first policy.

19. The communication system of claim 18, wherein the coordinating device is further configured to perform the following steps, to determine whether to change the coordinating policy indication:

determining whether the ratio is greater than a second ratio threshold; and when the coordinating device currently adopts the first policy and the ratio is greater than the second ratio threshold, the coordinating device changing the coordinating policy indication, so as to indicate that the policy adopted by the coordinating device is changed from the first policy to the second policy.

20. The communication system of claim 13, wherein the coordinating device is further configured to perform the following steps, to determine whether to change the coordinating policy indications:

obtaining a ratio of a neighboring-frame number of the plurality of neighboring frames to a frame number of a plurality of frames latest received by the coordinating device, wherein the plurality of frames comprises the plurality of neighboring frames;

determining whether the ratio is less than a second ratio threshold; and when the ratio is less than the second ratio threshold, the coordinating device changing the coordinating policy indication, so as to indicate that the policy adopted by the coordinating device is changed from the second policy to the first policy.

* * * * *